US012795223B2

(12) United States Patent
Liang et al.

(10) Patent No.: US 12,795,223 B2
(45) Date of Patent: Nov. 10, 2026

(54) LENS MODULE AND ELECTRONIC DEVICE FOR IMPROVING AN IMAGE QUALITY OF THE LENS MODULE

(71) Applicant: Newmax Technology Co., Ltd., Taichung City (TW)

(72) Inventors: Yung-Fu Liang, Taichung City (TW); Chiung-Hung Chen, Taichung City (TW)

(73) Assignee: NEWMAX TECHNOLOGY CO., LTD., Taichung City (TW)

(*) Notice: Subject to any disclaimer, the term of this patent is extended or adjusted under 35 U.S.C. 154(b) by 28 days.

(21) Appl. No.: 19/094,439

(22) Filed: Mar. 28, 2025

(65) Prior Publication Data

US 2026/0143218 A1 May 21, 2026

(30) Foreign Application Priority Data

Nov. 21, 2024 (TW) ................................ 113144974

(51) Int. Cl.

| | |
|---|---|
| ***H04N 23/55*** | (2023.01) |
| ***G02B 3/00*** | (2006.01) |
| ***G02B 3/04*** | (2006.01) |
| ***H04N 23/57*** | (2023.01) |

(52) U.S. Cl.

CPC ............... *H04N 23/55* (2023.01); *G02B 3/04* (2013.01); *H04N 23/57* (2023.01); *G02B 2003/0093* (2013.01)

(58) Field of Classification Search

CPC .......... H04N 23/55; H04N 23/57; G02B 3/04; G02B 2003/0093

USPC .......................................................... 348/374

See application file for complete search history.

(56) References Cited

U.S. PATENT DOCUMENTS

2020/0233175 A1* 7/2020 Chang .................... G02B 7/021

FOREIGN PATENT DOCUMENTS

DE 112019002889 * 4/2021

* cited by examiner

*Primary Examiner* — Joel W Fosselman

(74) *Attorney, Agent, or Firm* — Juan Carlos A. Marquez; Marquez IP Law Office, PLLC

(57) ABSTRACT

A lens module includes a lens barrel and an optical lens assembly. The optical lens assembly is disposed in the lens barrel. The optical lens assembly includes at least one lens. The lens includes an outer periphery, and the outer periphery includes first and second cut edges, which are respectively contracted toward a center of the lens along the Y axis. In the plan view of the lens along the central axis, each contour line of the first and second cut edges includes one of the following elements of: an arc line that is convex outward along the Y axis, an arc line that is concave inward along the Y axis, two oblique lines that are connected and convex outward along the Y axis, and two oblique lines that are connected and concave inward along the Y axis.

18 Claims, 14 Drawing Sheets

LENS MODULE AND ELECTRONIC DEVICE FOR IMPROVING AN IMAGE QUALITY OF THE LENS MODULE

This application claims the benefit of Taiwan Patent Application No. 113144974, filed on Nov. 21, 2024, which is hereby incorporated by reference for all purposes as if fully set forth herein.

BACKGROUND

Technical Field

The present disclosure relates to a lens module, and in particular to an electronic device having a lens module.

Related Art

The shooting function is already an indispensable function for terminal electronic devices (such as mobile phones, laptops, tablets, etc.). In order to obtain good image quality and camera effects, lens modules are installed in electronic devices to provide an extensive shooting function. Electronic devices emphasize the ratio of screen to body, and the front of a general electronic device not only has the display screen, but also has components such as front lens modules, which affects the ratio of screen to body according to the electronic device.

Currently, lightness, thinness and narrow frame of electronic devices are industry development needs. The lens module is usually disposed on the frame of the display screen of the electronic device. Since the lens module has a certain height and width, when the lens module is disposed on the frame of the display screen of the electronic device, it is difficult for the electronic device to achieve a narrow frame. The narrow frame will also increase the thickness of the electronic device and makes the electronic device difficult to achieve thinness and lightness.

An imaging circle of the lens module is usually larger than the size of the optical sensor, and currently it is a major design trend to contract the lens module in the specific direction to increase the ratio of screen to body. However, when the lens module in the prior art is contracted in the specific direction, additional stray light may be generated.

Thus, a lens module and an electronic device need to be provided for meeting previous requirements.

SUMMARY

An objective of the present disclosure is to provide a lens of a lens module, which eliminates stray light by designing structural cut edges to improve an image quality of the lens module.

To achieve the above objective, the present disclosure provides a lens module, defining a central axis, an X axis, a Y axis, an object side and an image side, wherein the central axis, the X axis and the Y axis are perpendicular to each other, and the lens module comprises: a lens barrel; and an optical lens assembly disposed in the lens barrel, wherein the optical lens assembly includes at least one lens; wherein the lens comprises an outer periphery, and the outer periphery comprises first and second cut edges, which are respectively contracted toward a center of the lens along the Y axis; and in a plan view of the lens along the central axis, each contour line of the first and second cut edges includes one of the following elements of: an arc line that is convex outward along the Y axis, an arc line that is concave inward along the Y axis, two oblique lines that are connected and convex outward along the Y axis, and two oblique lines that are connected and concave inward along the Y axis.

The present disclosure further provides an electronic device, comprising: a housing; the above-mentioned lens module disposed in the housing, and a control component disposed in the housing and electrically connected to an optical sensor of the lens module.

The lens of the lens module of the present disclosure can scatter light by designing structural cut edges (such as an arc line, two oblique lines, a combination of an arc line and a straight line, or a combination of two oblique lines and a straight line), thereby eliminating stray light to improve an image quality of the lens module.

DETAILED DESCRIPTION

To make the foregoing objectives, characteristics and features of the present disclosure more comprehensible, preferred embodiments of the present disclosure are described in detail below with reference to the accompanying drawings.

Figure 1:
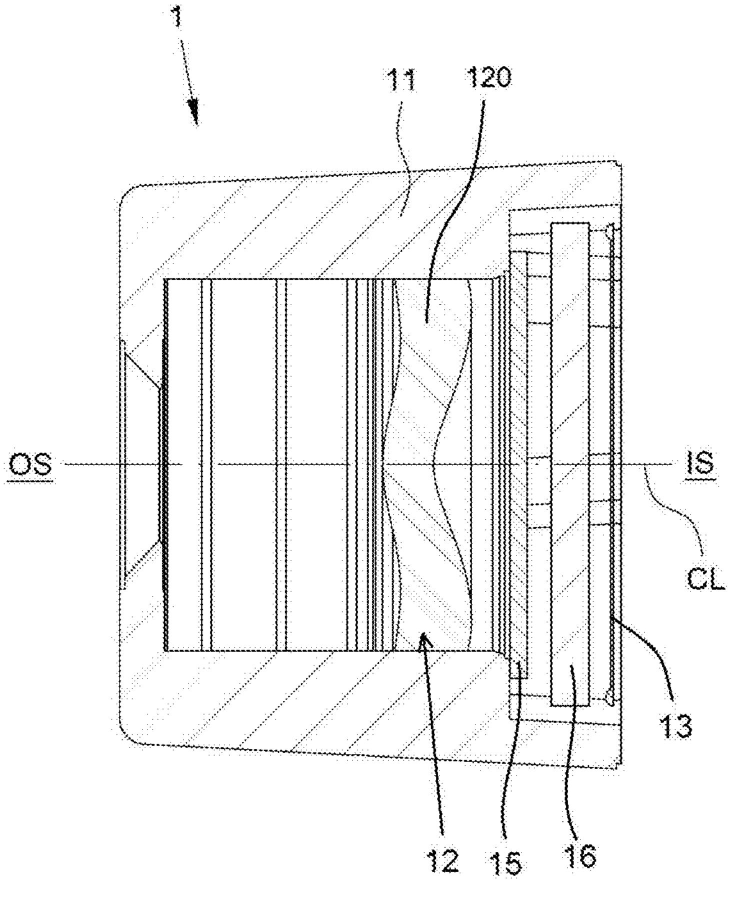
FIG. 1 is a schematic sectional view of a lens module according to an embodiment of the present disclosure.
Figure 2:
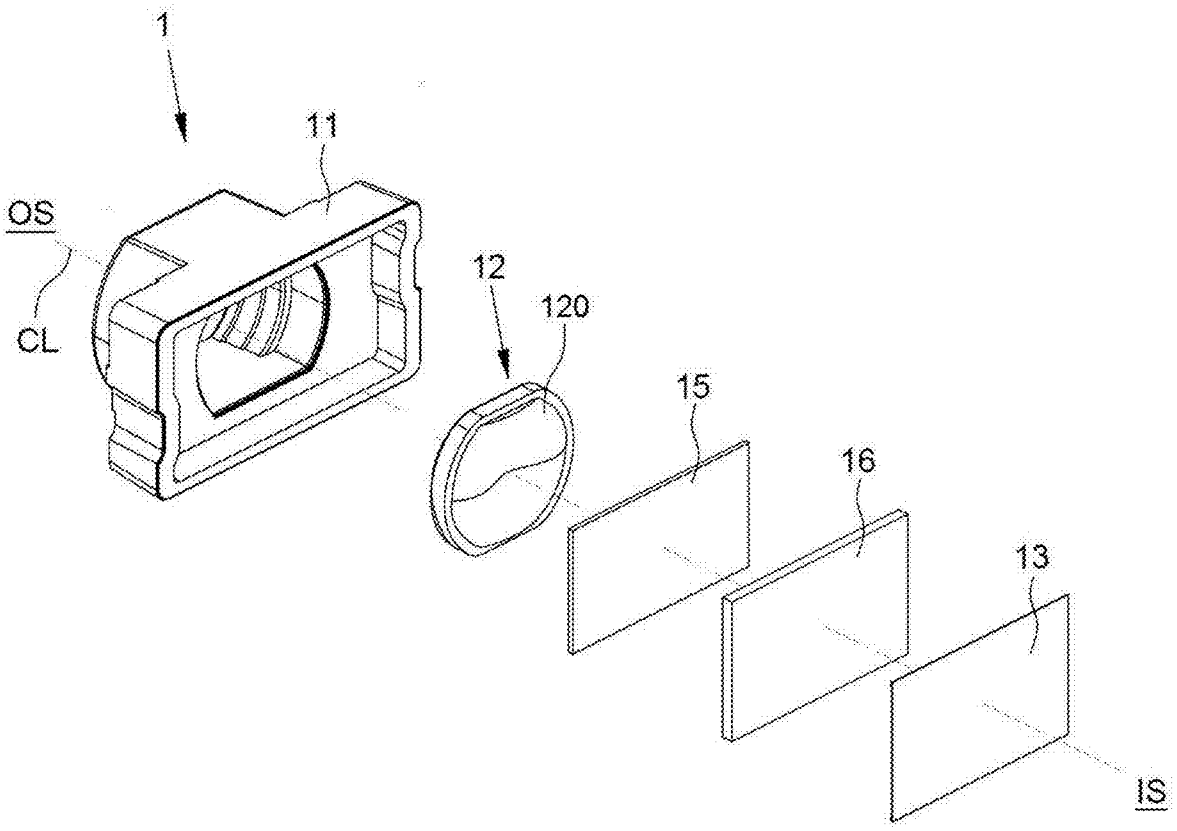
FIG. 2 is a schematic exploded perspective view of a lens module according to an embodiment of the present disclosure.
Figure 3:
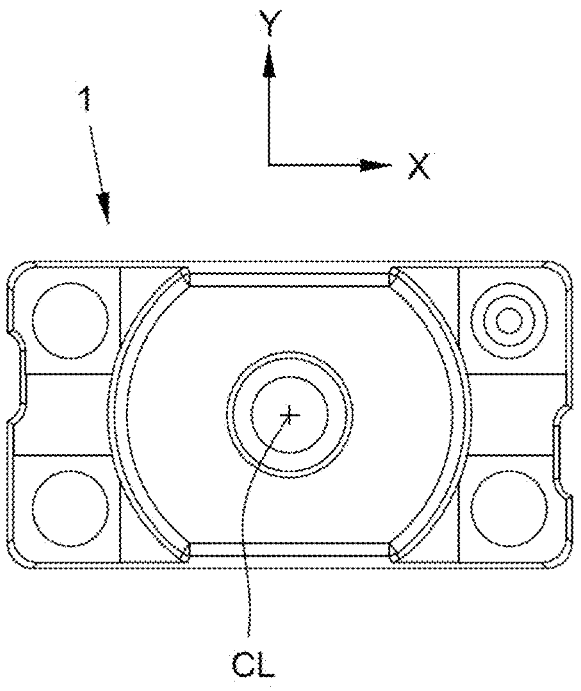
FIG. 3 is a schematic front view of a lens module according to an embodiment of the present disclosure.

FIG. 1 is a schematic sectional view of a lens module according to an embodiment of the present disclosure. FIG. 2 is a schematic exploded perspective view of a lens module according to an embodiment of the present disclosure. FIG. 3 is a schematic front view of a lens module according to an embodiment of the present disclosure. Referring to FIG. 1, FIG. 2 and FIG. 3, the lens module 1 defines a central axis CL, an X axis, a Y axis, an object side OS and an image side IS. The central axis CL, the X axis, the Y axes are perpendicular to each other, and the image side IS is opposite to the object side OS. The lens module 1 includes: a lens barrel 11, an optical lens assembly 12 and an optical sensor 13.

Refer to FIG. 1 and FIG. 2 again, the optical lens assembly 12 is disposed in the lens barrel 11, wherein the optical lens assembly 12 includes at least one lens 120. For example, the optical lens assembly 12 includes a plurality of lenses 120, such as a first lens to an N-th lens. The N-th lens is the lens of the optical lens assembly 12 that is the closest to the image side IS, and N is an integer greater than zero. The lens module 1 further includes a plurality of optical elements arranged in the lens barrel 11, and the optical elements can be an optical filter (such as an infrared optical filter, an infrared bandpass optical filter, or other optical band filters, etc.), a light-shielding element (for example, an aperture stop or a stop configured to correct edge light), spacers (e.g. as optical spacers between lenses) or the like.

The optical sensor 13 is disposed in the lens barrel 11 and is located on an image plane. The optical sensor 13 may be an image sensor. The lens module 1 further includes: an optical filter 15 and a cover glass 16, which are sequentially disposed between the optical lens assembly 12 and the optical sensor 13.

Figure 4:
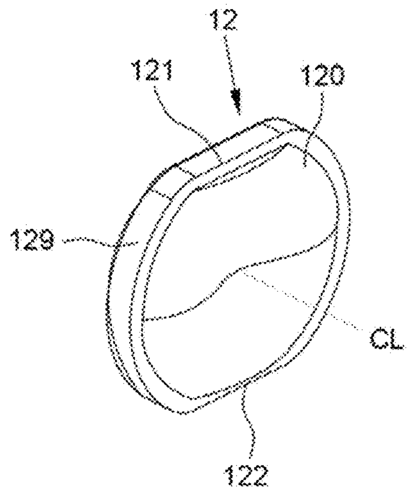
FIG. 4 is a schematic perspective view of a lens of a lens module according to an embodiment of the present disclosure.

FIG. 4 is a schematic perspective view of a lens of a lens module according to an embodiment of the present disclosure. Referring to FIG. 4, the lens 120 includes an outer periphery 129. The outer periphery 129 includes a first cut edge 121 and a second cut edge 122, which are respectively contracted toward the center (i.e., the position close to the central axis CL) of the lens 120 along the Y axis.

Figure 5A:
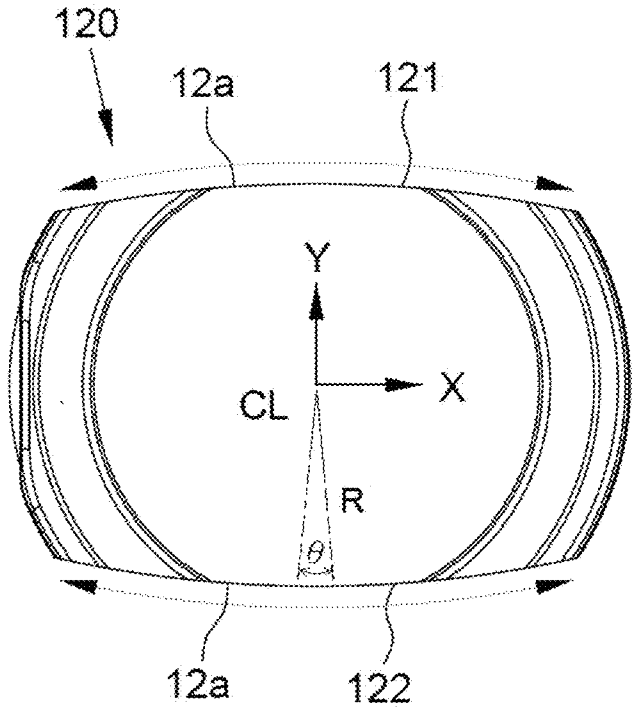
FIG. 5*a* is a schematic front plan view of a lens of a lens module according to the first embodiment of the present disclosure.

FIG. 5*a* is a schematic front plan view of a lens of a lens module according to the first embodiment of the present disclosure. In the plan view of the lens 120 along the central axis CL, each contour line of the first cut edge 121 and the second cut edge 122 includes: an arc line 12*a* that is convex outward along the Y axis. The arc line 12*a* can be symmetrical to the Y axis. The arc radius of the arc line 12 *a* is R, and the following condition is satisfied: 1 mm≤R<∞. The arc central angle of the arc line 12 *a* is θ, and the following conditions are satisfied: 1°≤θ≤90°.

Figure 5B:
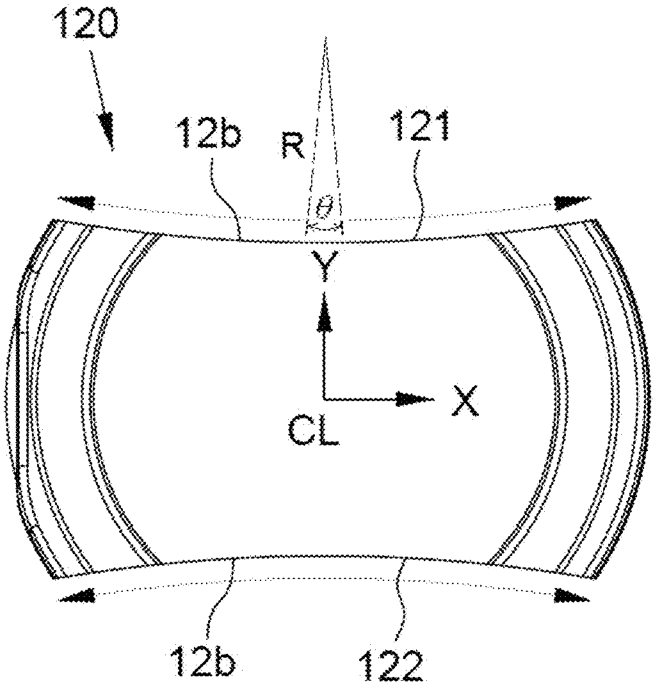
FIG. 5*b* is a schematic front plan view of a lens of a lens module according to the second embodiment of the present disclosure.

FIG. 5*b* is a schematic front plan view of a lens of a lens module according to the second embodiment of the present disclosure. In a plan view of the lens 120 along the central axis CL, each contour line of the first cut edge 121 and the second cut edge 122 includes: an arc line 12*b* that is concave inward along the Y axis. The arc line 12*b* can be symmetrical to the Y axis. The arc radius of the arc line 12 *b* is R, and the following condition is satisfied: 1 mm≤R<∞. The arc central angle of the arc line 12 *b* is θ, and the following conditions are satisfied: 1°≤θ≤90°.

Figure 5C:
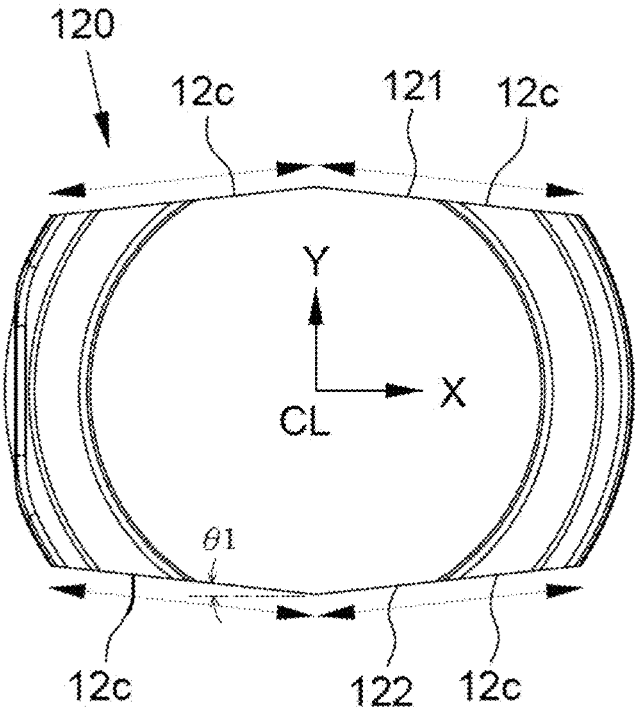
FIG. 5*c* is a schematic front plan view of a lens of a lens module according to the third embodiment of the present disclosure.

FIG. 5*c* is a schematic front plan view of a lens of a lens module according to the third embodiment of the present disclosure. In the plan view of the lens 120 along the central axis CL, each contour line of the first cut edge 121 and the second cut edge 122 includes: two oblique lines 12*c* that are connected and convex outward along the Y axis. The two oblique lines 12*c* can be symmetrical to the Y axis. The angle between the oblique line 12*c* and the X axis is an acute angle θ1, and the following conditions are satisfied: 0°≤θ1≤45°.

Figure 5D:
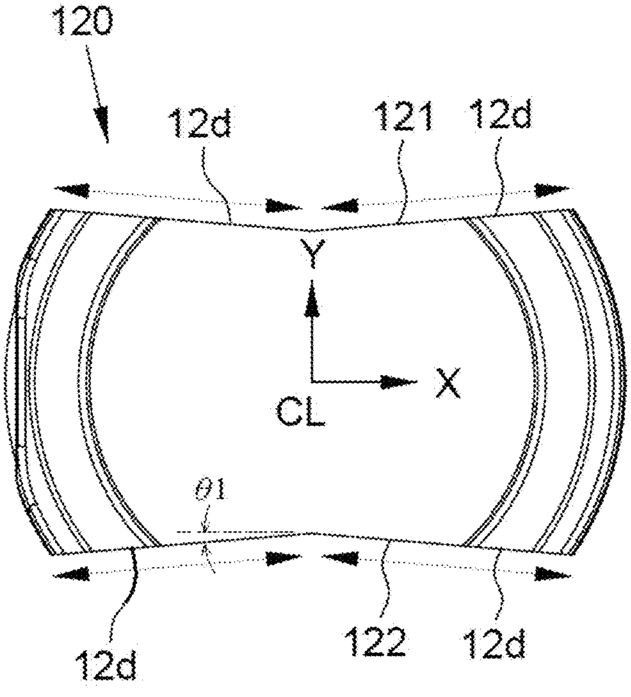
FIG. 5*d* is a schematic front plan view of a lens of a lens module according to the fourth embodiment of the present disclosure.

FIG. 5*d* is a schematic front plan view of a lens of a lens module according to the fourth embodiment of the present disclosure. In the plan view of the lens 120 along the central axis CL, each contour line of the first cut edge 121 and the second cut edge 122 includes: two oblique lines 12*d* that are connected and concave inward along the Y axis. The two oblique lines 12*d* can be symmetrical to the Y axis. The angle between the oblique line 12*d* and the X axis is an acute angle θ1, and the following conditions are satisfied: 0°≤θ1≤45°.

Figure 5E:
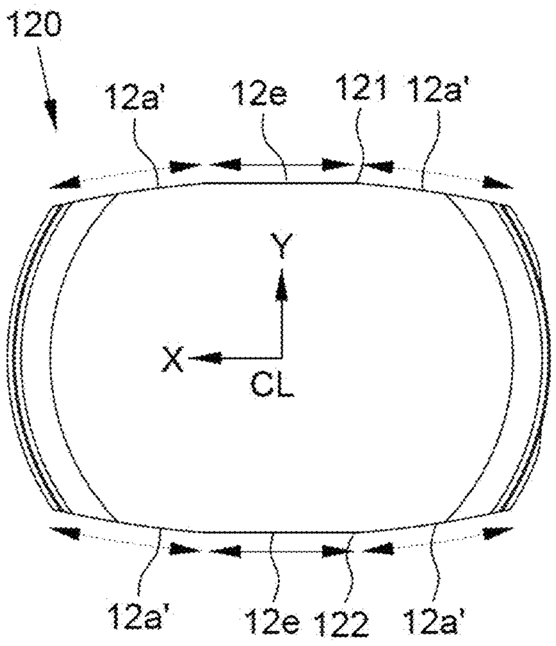
FIG. 5*e* is a schematic rear plan view of a lens of a lens module according to the fifth embodiment of the present disclosure.

FIG. 5*e* is a schematic rear plan view of a lens of a lens module according to the fifth embodiment of the present disclosure. In the plan view of the lens 120 along the central axis CL, each contour line of the first cut edge 121 and the second cut edge 122 includes: an arc line 12*a*' that is convex outward along the Y axis. The arc line 12*a*' can be symmetrical to the Y axis. Each contour line of the first cut edge 121 and the second cut edge 122 further includes a straight line 12*e*, the straight line 12*e* is parallel to the X axis, and the straight line 12*e* is connected between the two arc sections of the arc line 12*a*'. The arc radius of the arc line 12*a*' is R, and the following condition is satisfied: 1 mm≤R<∞. The central angle of the arc line 12*a*' is θ, and the following condition is satisfied: 1°≤θ≤90°.

Figure 5F:
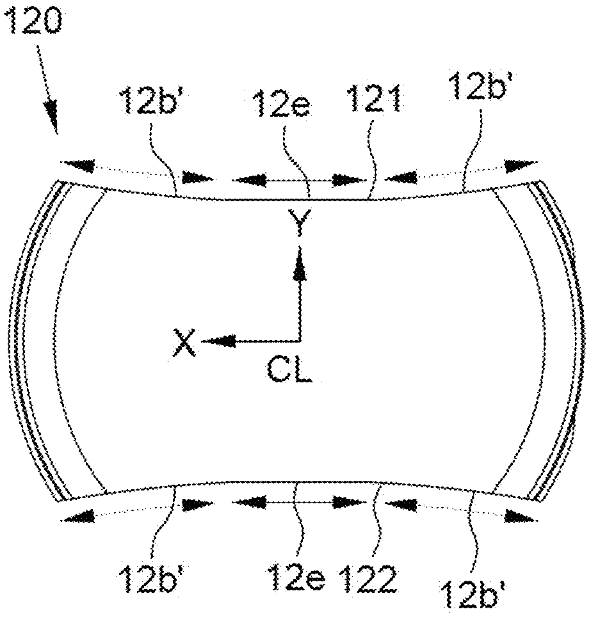
FIG. 5*f* is a schematic rear plan view of a lens of a lens module according to the sixth embodiment of the present disclosure.

FIG. 5*f* is a schematic rear plan view of a lens of a lens module according to the sixth embodiment of the present disclosure. In the plan view of the lens 120 along the central axis CL, each contour line of the first cut edge 121 and the second cut edge 122 includes: an arc line 12*b*' that are concave inward along the Y axis. The arc line 12*b*' can be symmetrical to the Y axis. Each contour line of the first cut edge 121 and the second cut edge 122 further includes a straight line 12*e*, the straight line 12*e* is parallel to the X axis, and the straight line 12*e* is connected between the two arc sections of the arc line 12*b*'. The arc radius of the arc line 12*b*' is R, and the following condition is satisfied: 1 mm≤R<∞. The central angle of the arc line 12 *b*' is θ, and the following condition is satisfied: 1°≤θ≤90°.

Figure 5G:
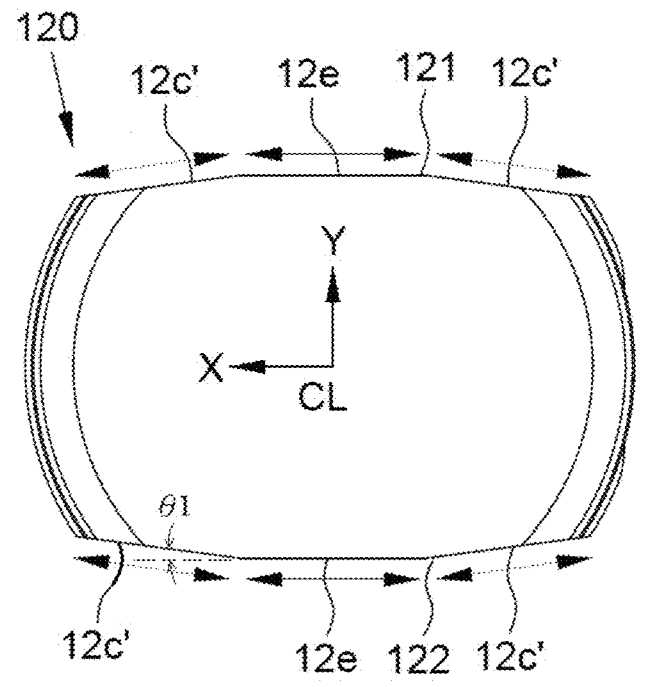
FIG. 5*g* is a schematic rear plan view of a lens of a lens module according to the seventh embodiment of the present disclosure.

FIG. 5*g* is a schematic rear plan view of a lens of a lens module according to the seventh embodiment of the present disclosure. In the plan view of the lens 120 along the central axis CL, each contour line of the first cut edge 121 and the second cut edge 122 includes: two oblique lines 12*c*' that are connected and convex outward along the Y axis. The two oblique lines 12*c*' can be symmetrical to the Y axis. Each contour line of the first cut edge 121 and the second cut edge 122 further includes a straight line 12*e*, the straight line 12*e* is parallel to the X axis, and the two oblique lines 12*c*' are connected through the straight line 12*e*. The angle between the oblique line 12*c*' and the X axis is an acute angle θ1, and the following condition is satisfied: 0°≤θ1≤45°.

Figure 5H:
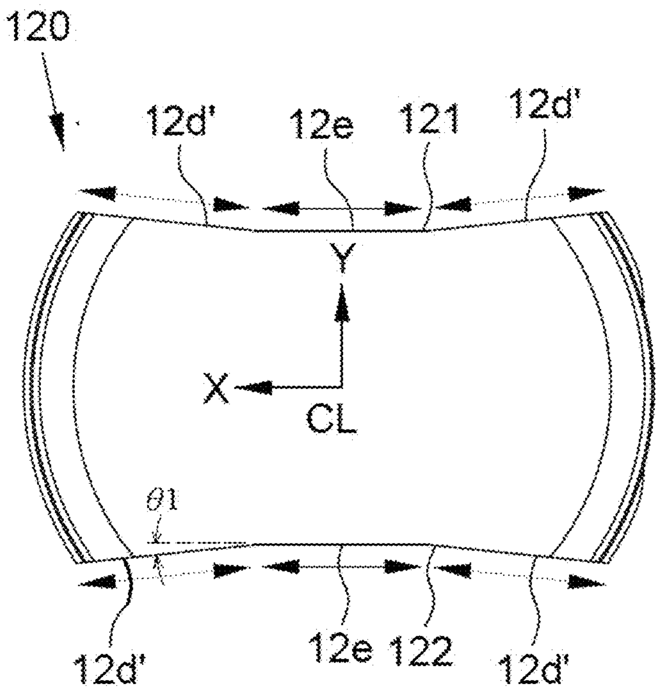
FIG. 5*h* is a schematic rear plan view of a lens of a lens module according to the eighth embodiment of the present disclosure.

FIG. 5*h* is a schematic rear plan view of a lens of a lens module according to the eighth embodiment of the present disclosure. In the plan view of the lens 120 along the central axis CL, each contour line of the first cut edge 121 and the second cut edge 122 includes: two oblique lines 12*d*' that are connected and concave inward along the Y axis. The two oblique lines 12*d*' can be symmetrical to the Y axis. Each contour line of the first cut edge 121 and the second cut edge 122 further includes a straight line 12*e*, the straight line 12*e* is parallel to the X axis and the two oblique lines 12*d*' are connected through the straight line 12*e*. The angle between the oblique line 12*d*' and the X axis is an acute angle θ1, and the following condition is satisfied: 0°≤θ1≤45°.

The lens of the lens module in the prior art has the conventional design of cut edges, and each contour line of the cut edges is a simple straight line. When light hits a position of the cut edges of the lens, stray light is easily generated. The lenses of the lens modules of the above-mentioned first to eighth embodiments of the present disclosure scatter light by designing the structural cut edges (such as an arc line, two oblique lines, a combination of an arc line and a straight line, or a combination of two oblique lines and a straight line), thereby eliminating the stray light to improve an image quality of the lens module.

Figure 5I:
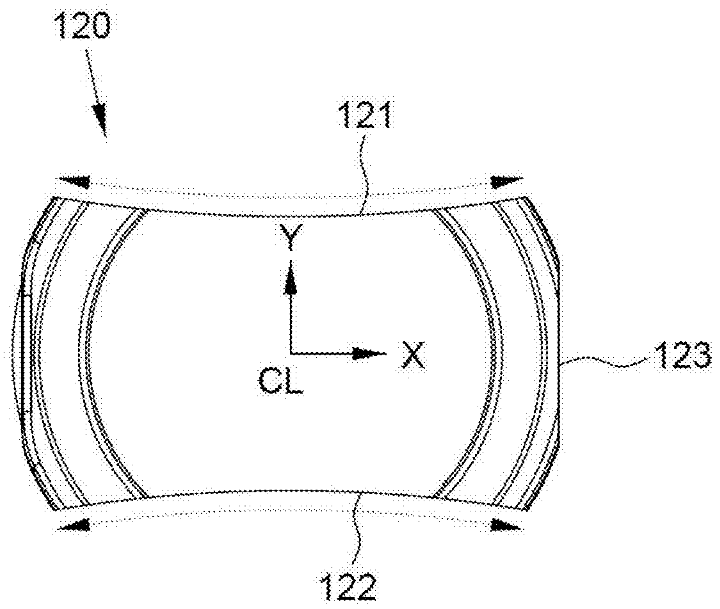
FIG. 5*i* is a schematic front plan view of a lens of a lens module according to the ninth embodiment of the present disclosure.

FIG. 5*i* is a schematic front plan view of a lens of a lens module according to the ninth embodiment of the present disclosure. Referring to FIG. 4 and FIG. 5*i*, the outer periphery 129 further includes a third cut edge 123 that is contracted along the X axis toward the center (i.e., position close to the central axis CL) of the lens 120. The lens of the lens module in the prior art was designed with two cut edges, which is contracted along the Y axis, and possibly has the problem of uneven assembled forces. The lens of the lens module of the above-mentioned ninth embodiment adopts a multi-directional (along the Y axis and the X axis) cut edges, so that the assembled force can be uniform, and the lens can be deformed uniformly.

Figure 6:
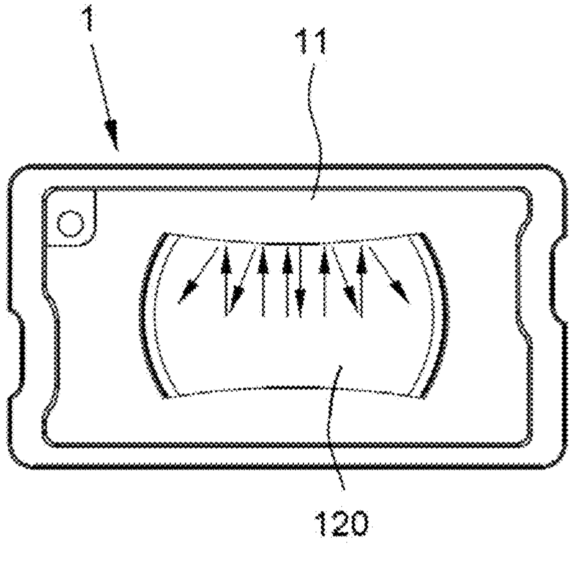
FIG. 6 is a schematic rear view of a lens barrel and a lens of a lens module according to an embodiment of the present disclosure.

FIG. 6 is a schematic rear view of a lens barrel and a lens of a lens module according to an embodiment of the present disclosure. FIG. 6 shows the lens barrel 11 and the lens 120 of the lens module 1 in the sixth embodiment. The contour line including simple straight line causes the light to still be reflected in the same direction, and the cut edges of the lens barrel 11 and the lens 120 have the contour line including the arc line that is concave inward along the Y axis can scatter reflected light to eliminate stray light.

Figure 7A:
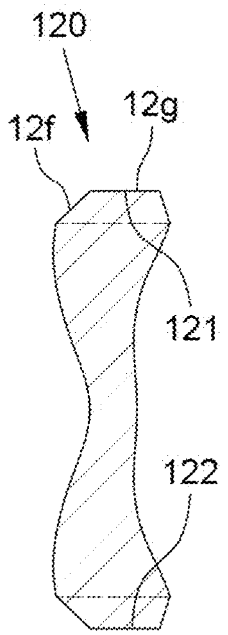
FIG. 7*a* is a schematic sectional view of a lens of a lens module according to the tenth embodiment of the present disclosure.
Figure 7B:
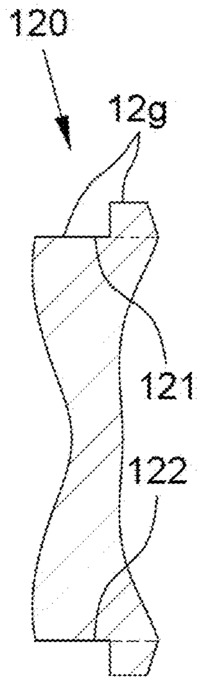
FIG. 7*b* is a schematic sectional view of a lens of a lens module according to the eleventh embodiment of the present disclosure.
Figure 7C:
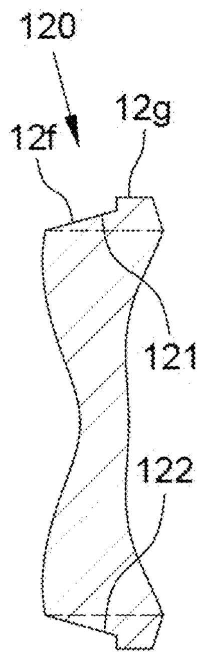
FIG. 7*c* is a schematic sectional view of a lens of a lens module according to the twelfth embodiment of the present disclosure.
Figure 7D:
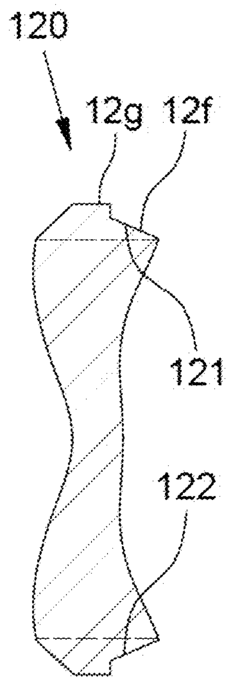
FIG. 7*d* is a schematic sectional view of a lens of a lens module according to the thirteenth embodiment of the present disclosure.

FIG. 7*a* is a schematic sectional view of a lens of a lens module according to the tenth embodiment of the present disclosure. FIG. 7*b* is a schematic sectional view of a lens of a lens module according to the eleventh embodiment of the present disclosure. FIG. 7*c* is a sectional view of a lens of a lens module according to the twelfth embodiment of the present disclosure. FIG. 7*d* is a schematic sectional view of a lens of a lens module according to the thirteenth embodiment of the present disclosure. Referring to FIG. 3 and FIG. 7*a* to FIG. 7*d*, in a sectional view of the lens 120 along the X axis the first cut edge 121 and the second cut edge 122 are selected from the group consisting of: at least one oblique plane 12*f*, at least one horizontal plane 12*g*, or a combination of at least one oblique plane 12*f* and at least one horizontal plane 12*g*.

The cut edges of the lens of the lens module in the prior art is designed with of the cut edge having simple straight line or two cut edges. The cut edge having simple straight line is easy to generate stray light, the lens has insufficient strength at the positions of the two cut edges, and burrs is produced to hinder assembly alignment. The cross-section of the lens in the tenth embodiment is a multi-cut-edge design, which can simultaneously eliminate the stray light, increase alignment strength, and improve alignment accuracy. Furthermore, the cut edges of the lens of the lens module in the prior art are designed without a supporting platform, and during assembly there are only non-cut-edge portion for support. The lenses in the above-mentioned eleventh, twelfth and thirteenth embodiments are designed to use a supporting oblique plane or a supporting horizontal plane as a supporting platform to improve the assembly reliability of the lens. In addition, during lens manufacturing, the molding fluidity in the above-mentioned twelfth and thirteenth embodiments is also simultaneously considered, and the supporting platform is connected smoothly to the optical region of the lens by the oblique plane.

Figure 8:
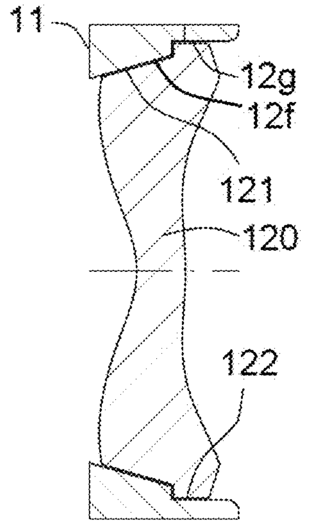
FIG. 8 is a schematic partial sectional view of a lens barrel and lens of a lens module according to an embodiment of the present disclosure.

The lens of the lens module in the prior art includes two cut edges, the edge of the lens is weak in strength and prone to burrs, and the burrs affect the assembly alignment. FIG. 8 is a schematic partial sectional view of a lens barrel and lens of a lens module according to an embodiment of the present disclosure. FIG. 8 shows the lens 120 in the twelfth embodiment. The lens in the twelfth embodiment can enhance the edge strength of the lens by the multi-cut-edge design, improve the burr condition to improve the alignment accuracy during assembly, and be designed with a supporting platform, whereby the non-cut-edge position or the cut-edge position of the lens are supported by the lens barrel accordingly, and the assembly reliability can be improved.

Figure 9A:
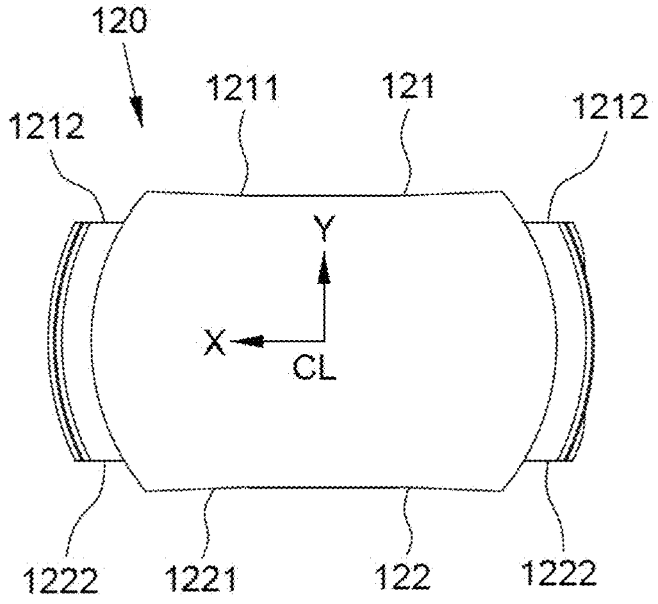
FIG. 9*a* is a schematic rear view of a lens of a lens module of the fourteenth embodiment of the present disclosure.
Figure 9B:
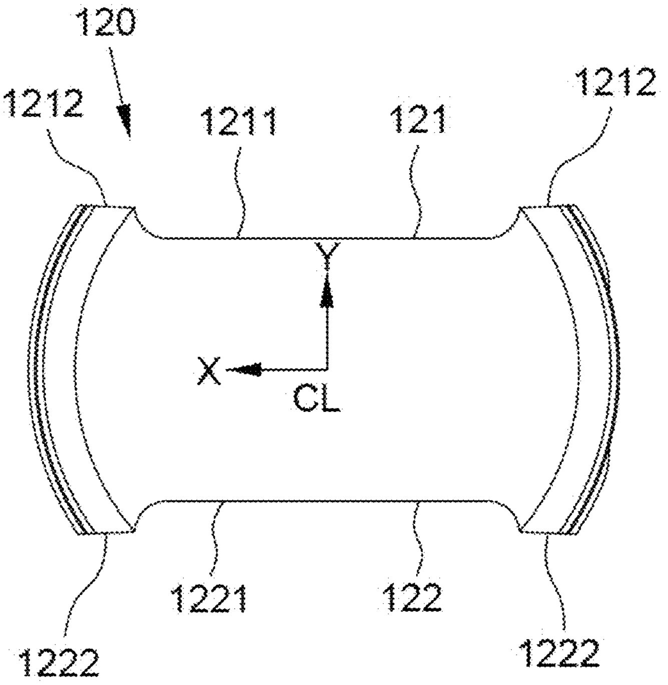
FIG. 9*b* is a schematic rear view of a lens of a lens module of the fifteenth embodiment of the present disclosure.

FIG. 9*a* is a schematic rear view of a lens of a lens module of the fourteenth embodiment of the present disclosure. Each contour line of the first cut edge 121 and the second cut edge 122 further includes a first contour line 1211, 1221 (located in the optical region) and a second contour line 1212, 1222 (located in the non-optical region), the first contour line 1211, 1221 and the second contour lines 1212, 1222 are not aligned with each other, and the second contour lines 1212, 1222 are located on both sides of the first contour lines 1211, 1221. The first contour lines 1211 and 1221 are farther from the center (e.g., the center refers to a position closer to the central axis CL) of the lens 120 than the second contour lines 1212, 1222 along the Y axis. FIG. 9*b* is a schematic rear view of a lens of a lens module of the fifteenth embodiment of the present disclosure. The first contour lines 1211, 1221 are closer to the center (e.g., the center refers to a position close to the central axis CL) of the lens 120 along the Y axis than the second contour lines 1212, 1222.

The first contour line (located in the optical region) and the second contour line (located in the non-optical region) of the cut edges are not aligned. The non-optical region of the cut edges of the lens of the lens module in the fourteenth embodiment is contracted inward. The non-optical region of the lens of the lens module in the fifteenth embodiment is expanded outward. By designing that the first contour line (located in the optical region) and the second contour line (located in the non-optical region) of the lens module are not aligned, it can adjust the dispensing range of glue and then adjust the destructive strength (by a push test) of the lens module.

Figure 10A:
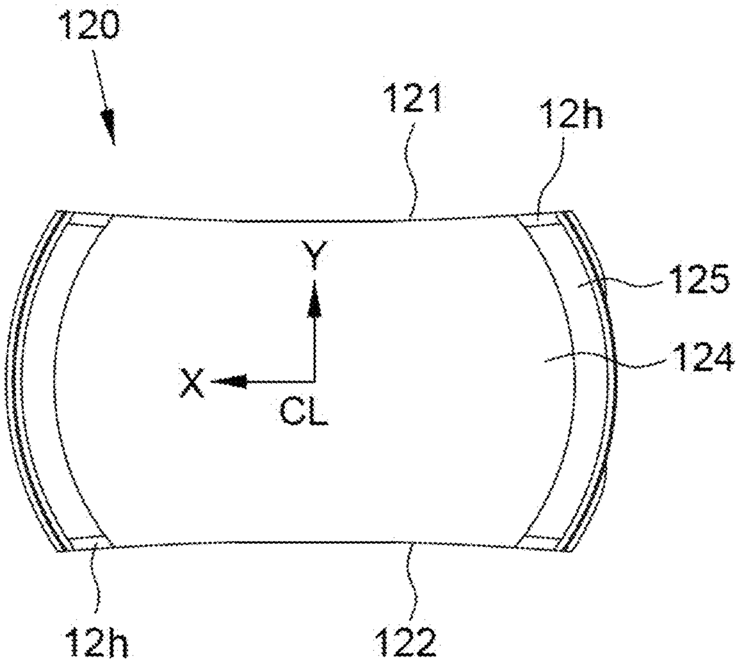
FIG. 10*a* is a schematic rear view of a lens of a lens module of the sixteenth embodiment of the present disclosure.
Figure 10B:
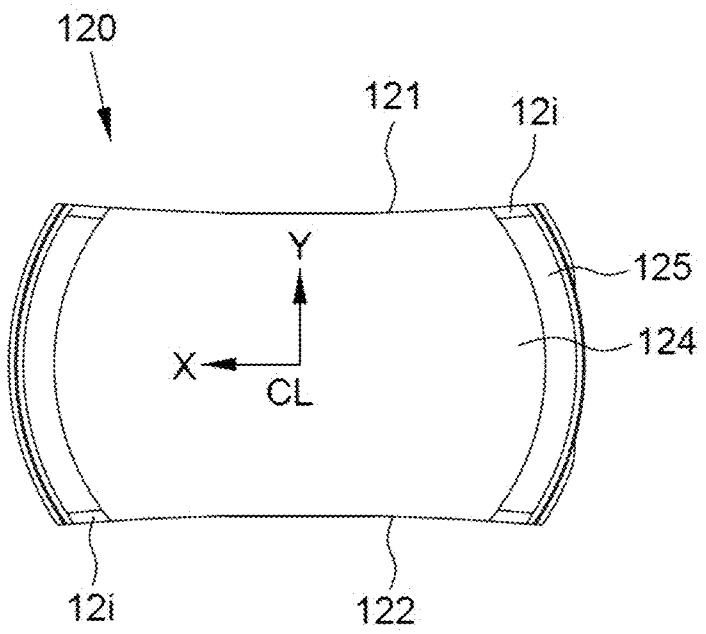
FIG. 10*b* is a schematic rear view of a lens of a lens module of the seventeenth embodiment of the present disclosure.

FIG. 10*a* is a schematic rear view of a lens of a lens module of the sixteenth embodiment of the present disclosure. A non-optical region 125 of an image-side surface 124 of the lens 120 is provided with a plurality of convex portions 12*h*. The convex portions 12*h* are adjacent to the first cut edge 121 and the second cut edge 122, and the convex portions 12*h* can prevent glue from overflowing. FIG. 10*b* is a schematic rear view of a lens of a lens module of the seventeenth embodiment of the present disclosure. A non-optical region 125 of an image-side surface 124 of the lens 120 is provided with a plurality of concave portions 12*i*. The concave portions 12*i* are adjacent to the first cut edge 121 and the second cut edge 122, and the concave portions 12*i* can prevent glue from overflow. In detailed, the lenses of the lens modules in the sixteenth and seventeenth embodiments are provided with microstructures of convex portions or concave portions in the non-optical region, so that after dispensing the glue can be controlled on the surface of the non-optical region without overflowing downward. According to the convex portion in the sixteenth embodiment, the glue flows to the convex portion and is blocked due to the high height of the concave portion; and according to the convex portion in the seventeenth embodiment, the glue flows to the concave portion and is accumulated in the concave portion, and the concave portion is allowed to accommodate excess glue.

Figure 11:
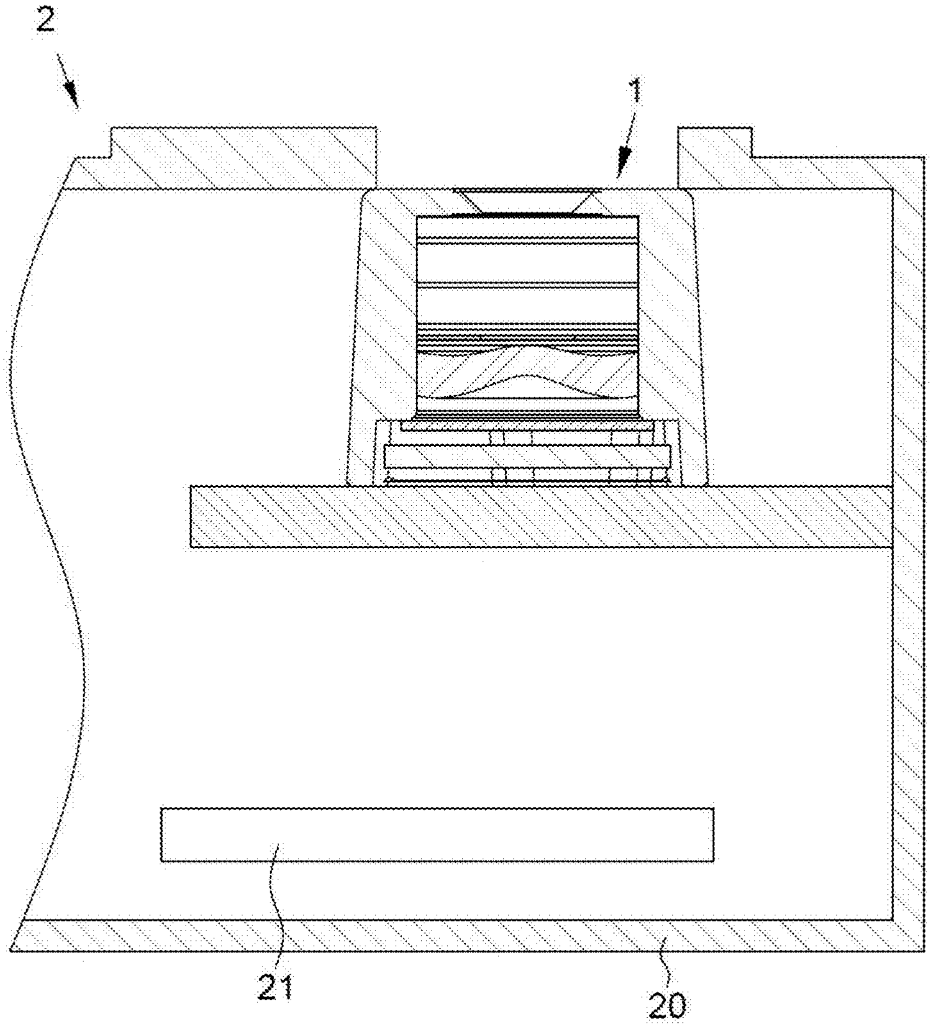
FIG. 11 is a schematic sectional view of an electronic device according to an embodiment of the present disclosure.

FIG. 11 is a schematic sectional view of an electronic device according to an embodiment of the present disclosure. The electronic device 2 includes: a housing 20, the lens module 1 of the present disclosure, and a control component 21. The lens module 1 is disposed in the housing 20. The control component 21 is disposed in the housing 20 and is electrically connected to the optical sensor of the lens module 1. The electronic device 2 of the present disclosure can be a mobile phone, a laptop, etc. In addition, the lens module provided by the present disclosure may be used in photography, surveillance, automation equipment, vehicle surround systems, and electronic imaging systems in the internet of things (IOT) equipment, but is not limited thereto.

In view of the above, the foregoing descriptions are merely preferred embodiments of technical means adopted by the present disclosure to solve the problem, but are not intended to limit the scope of the embodiments of the present disclosure. That is, all equivalent changes and modifications made in accordance with the scope of the patent application of the present disclosure or made in accordance with the scope of the patent of the present disclosure fall within the scope of the patent of the present disclosure.

What is claimed is:

1. A lens module, defining a central axis, an X axis, a Y axis, an object side and an image side, wherein the central axis, the X axis and the Y axis are perpendicular to each other, and the lens module comprises:

a lens barrel; and an optical lens assembly disposed in the lens barrel, wherein the optical lens assembly includes at least one lens; and wherein the lens comprises an outer periphery, and the outer periphery comprises first and second cut edges, which are respectively contracted toward a center of the lens along the Y axis; and wherein in a plan view of the lens along the central axis, each contour line of the first and second cut edges includes one of the following elements of: an arc line that is convex outward along the Y axis, an arc line that is concave inward along the Y axis, two oblique lines that are connected and convex outward along the Y axis, and two oblique lines that are connected and concave inward along the Y axis.

2. The lens module according to claim 1, wherein each contour line of the first and second cut edges further includes a straight line, the straight line is parallel to the X axis and the straight line is connected between the two arc sections of the arc line.

3. The lens module according to claim 1, wherein each contour line of the first and second cut edges further includes a straight line, the straight line is parallel to the X axis and the two oblique lines are connected through the straight line.

4. The lens module according to claim 1, wherein the outer periphery further includes third cut edge, which is contracted toward the center of the lens along the X axis.

5. The lens module according to claim 1, wherein an arc radius of the arc line is R, and the following conditions are satisfied: $1\ \text{mm} \leq R \leq \infty$.

6. The lens module according to claim 1, wherein the angle between the oblique line and the X axis is an acute angle θ1, and the following conditions are satisfied: $0° \leq \theta 1 \leq 45°$.

7. The lens module according to claim 1, wherein in a sectional view of the lens along the X axis, the first and second cut edges are selected from the group consisting of: at least one oblique plane, at least one horizontal plane, and a combination of at least one oblique plane and at least one horizontal plane.

8. The lens module according to claim 1, wherein each contour line of the first and second cut edges further includes first and second contour lines which are connected, the first and second contour lines are not aligned with each other, the second contour line is located on both sides of the first contour line, and the first contour line is closer to or farther from the center of the lens than the second contour line along the Y axis.

9. The lens module according to claim 1, wherein a non-optical region of an image-side surface of the lens is provided with a plurality of convex portions or a plurality of concave portions, and the convex portions or the concave portions are adjacent to the first and second cut edges.

10. An electronic device, comprising:

a housing;

a lens module disposed in the housing, wherein:

the lens module defines a central axis, an X axis, a Y axis, an object side and an image side, wherein the central axis, the X axis and the Y axis are perpendicular to each other, and the lens module comprises:

a lens barrel; and an optical lens assembly disposed in the lens barrel, wherein the optical lens assembly includes at least one lens;

wherein the lens comprises an outer periphery, and the outer periphery comprises first and second cut edges, which are respectively contracted toward a center of the lens along the Y axis; and wherein in a plan view of the lens along the central axis, each contour line of the first and second cut edges includes one of the following elements of: an arc line that is convex outward along the Y axis, an arc line that is concave inward along the Y axis, two oblique lines that are connected and convex outward along the Y axis, and two oblique lines that are connected and concave inward along the Y axis; and a control component disposed in the housing and electrically connected to an optical sensor of the lens module.

11. The electronic device according to claim 10, wherein each contour line of the first and second cut edges further includes a straight line, the straight line is parallel to the X axis and the straight line is connected between the two arc sections of the arc line.

12. The electronic device according to claim 10, wherein each contour line of the first and second cut edges further includes a straight line, the straight line is parallel to the X axis and the two oblique lines are connected through the straight line.

13. The electronic device according to claim 10, wherein the outer periphery further includes third cut edge, which is contracted toward the center of the lens along the X axis.

14. The electronic device according to claim 10, wherein an arc radius of the arc line is R, and the following conditions are satisfied: $1\ mm \leq R \leq \infty$.

15. The electronic device according to claim 10, wherein the angle between the oblique line and the X axis is an acute angle θ1, and the following conditions are satisfied: $0° \leq \theta 1 \leq 45°$.

16. The electronic device according to claim 10, wherein in a sectional view of the lens along the X axis, the first and second cut edges are selected from the group consisting of: at least one oblique plane, at least one horizontal plane, and a combination of at least one oblique plane and at least one horizontal plane.

17. The electronic device according to claim 10, wherein each contour line of the first and second cut edges further includes first and second contour lines which are connected, the first and second contour lines are not aligned with each other, the second contour line is located on both sides of the first contour line, and the first contour line is closer to or farther from the center of the lens than the second contour line along the Y axis.

18. The electronic device according to claim 10, wherein a non-optical region of an image-side surface of the lens is provided with a plurality of convex portions or a plurality of concave portions, and the convex portions or the concave portions are adjacent to the first and second cut edges.

* * * * *